(12) United States Patent
Ongyanco (10) Patent No.: US 11,687,485 B2
(45) Date of Patent: *Jun. 27, 2023

(54) SYSTEMS AND METHODS FOR MONITORING SERIAL COMMUNICATION BETWEEN DEVICES

(71) Applicant: Astec International Limited, Kowloon (HK)

(72) Inventor: Donald Cedrick Ongyanco, Quezon (PH)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,789

(22) Filed: Nov. 19, 2021

(65) Prior Publication Data

US 2022/0075754 A1   Mar. 10, 2022

Related U.S. Application Data

(63) Continuation of application No. 16/942,417, filed on Jul. 29, 2020, now Pat. No. 11,210,260.

(51) Int. Cl.
*G06F 13/42* (2006.01)
*G06F 11/30* (2006.01)

(52) U.S. Cl.
CPC ...... *G06F 13/4291* (2013.01); *G06F 11/3027* (2013.01); *G06F 13/4295* (2013.01); *G06F 2213/0016* (2013.01)

(58) Field of Classification Search
CPC ............. G06F 13/4291; G06F 11/3027; G06F 2213/0016
See application file for complete search history.

(56) References Cited

U.S. PATENT DOCUMENTS 9,432,298 B1 * 8/2016 Smith ................. H04L 49/9057
9,772,666 B1 * 9/2017 Kam ....................... G06F 1/263
(Continued)

FOREIGN PATENT DOCUMENTS

CN   107766200 A   3/2018
CN   109710048 A   5/2019
(Continued)

OTHER PUBLICATIONS

Extended European Search Report for EP Application No. 21182071.7, dated Dec. 16, 2021; 8 pages.
(Continued)

*Primary Examiner* — David E Martinez (57) ABSTRACT

A system for monitoring inter-integrated circuit (I2C) communication includes a power supply, a battery backup unit, an I2C serial clock line (SCL) coupled between the power supply and the battery backup unit, an I2C serial data line (SDA) coupled between the power supply and the battery backup unit, and a controller. A first monitor line is coupled between the controller and the I2C serial clock line, and a second monitor line is coupled between the controller and the I2C serial data line. The controller is configured to monitor a digital communication transmitted on the I2C serial clock and data lines between the power supply and the battery backup unit, interpret a message included in the monitored digital communication, and perform a control function according to the interpreted message.

19 Claims, 4 Drawing Sheets

(56) References Cited

U.S. PATENT DOCUMENTS

| | | | |
|---|---|---|---|
| 2007/0240019 A1* | 10/2007 | Brady | G06F 13/4291 |
| | | | 710/110 |
| 2008/0018486 A1 | 1/2008 | Terasawa | |
| 2012/0169117 A1* | 7/2012 | Park | H02J 7/00304 |
| | | | 320/136 |
| 2012/0311211 A1 | 12/2012 | Gao | |
| 2014/0334101 A1 | 11/2014 | Yu | |
| 2017/0308433 A1 | 10/2017 | Kwon et al. | |
| 2019/0236281 A1 | 8/2019 | Hershman et al. | |

FOREIGN PATENT DOCUMENTS

| | | |
|---|---|---|
| CN | 109863479 A | 6/2019 |
| JP | 2002108733 A | 4/2002 |
| JP | 2016167107 A | 9/2016 |
| TW | 201514708 A | 4/2015 |
| TW | 201741808 A | 12/2017 |
| TW | 201823886 A | 7/2018 |
| WO | 2010097831 A1 | 9/2010 |

OTHER PUBLICATIONS

Vincente Carvalho, et al., Enhancing 12C Robustness to Soft Errors; IEEE, 2017; 4 pages.
Japan Office Action for Japan Application No. 2021-112482; dated Oct. 4, 2022; 4 pages (with translation).
Taiwan Office Action for TW Application No. 110126214; dated Aug. 23, 2022; 4 pages (translation only).

* cited by examiner

SYSTEMS AND METHODS FOR MONITORING SERIAL COMMUNICATION BETWEEN DEVICES

CROSS-REFERENCE TO RELATED APPLICATIONS

This application claims the benefit of and priority to U.S. application Ser. No. 16/942,417 filed Jul. 29, 2020. The entire disclosure of the above application is incorporated herein by reference.

FIELD

The present disclosure relates to systems and methods for monitoring serial communication between devices, including inter-integrated circuit (I2C) communication between a power supply unit (PSU) and a battery backup unit (BBU).

BACKGROUND

This section provides background information related to the present disclosure which is not necessarily prior art.

An inter-integrated circuit (I2C) bus is a communication bus for connecting electronic devices, and may be serial, synchronous, multi-master, multi-slave, packet switched, single-ended, etc. I2C communication typically uses two bidirectional open collector or open drain lines, including a Serial Data Line (SDA) and a Serial Clock Line (SCL). The lines may be pulled up with resistors, and voltages of +5V or +3.3V are commonly used.

Messages may be transmitted from one electronic device to another on the SDA and SCL lines of the communication bus. The messages may be monitored using an oscilloscope with a serial decoder or an I2C bus analyzer that displays the contents of the message.

SUMMARY

This section provides a general summary of the disclosure, and is not a comprehensive disclosure of its full scope or all of its features.

According to one aspect of the present disclosure, a system for monitoring inter-integrated circuit (I2C) communication includes a power supply, a battery backup unit, an I2C serial clock line (SCL) coupled between the power supply and the battery backup unit, an I2C serial data line (SDA) coupled between the power supply and the battery backup unit, and a controller. A first monitor line is coupled between the controller and the I2C serial clock line, and a second monitor line is coupled between the controller and the I2C serial data line. The controller is configured to monitor a digital communication transmitted on the I2C serial clock and data lines between the power supply and the battery backup unit, interpret a message included in the monitored digital communication, and perform a control function according to the interpreted message.

According to another aspect of the present disclosure, a method for monitoring serial communication in a system is disclosed. The system includes a power supply, a battery backup unit, a serial bus coupled between the power supply unit and the battery backup unit, a controller, and a monitor line coupled between the controller and the serial bus. The method includes monitoring, by the controller, a serial communication transmitted on the serial bus between the power supply unit and the battery backup unit, interpreting a message included in the monitored serial communication on the serial bus, and performing a control function according to the interpreted message of the digital communication.

According to another aspect of the present disclosure, a system for monitoring serial communication includes a master electronic device, and a slave electronic device connected with the master electronic device via a serial bus connection. The serial bus connection includes a first serial line coupled between the master electronic device and the slave electronic device and a second serial line coupled between the master electronic device and the slave electronic device. The system also includes a controller, a first monitor line coupled between the controller and the first serial line, and a second monitor line coupled between the controller and the second serial line. The controller is configured to monitor a serial communication transmitted on the serial bus connection between the master electronic device and the slave electronic device, interpret a message included in the monitored serial communication, and perform a control function according to the interpreted message.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
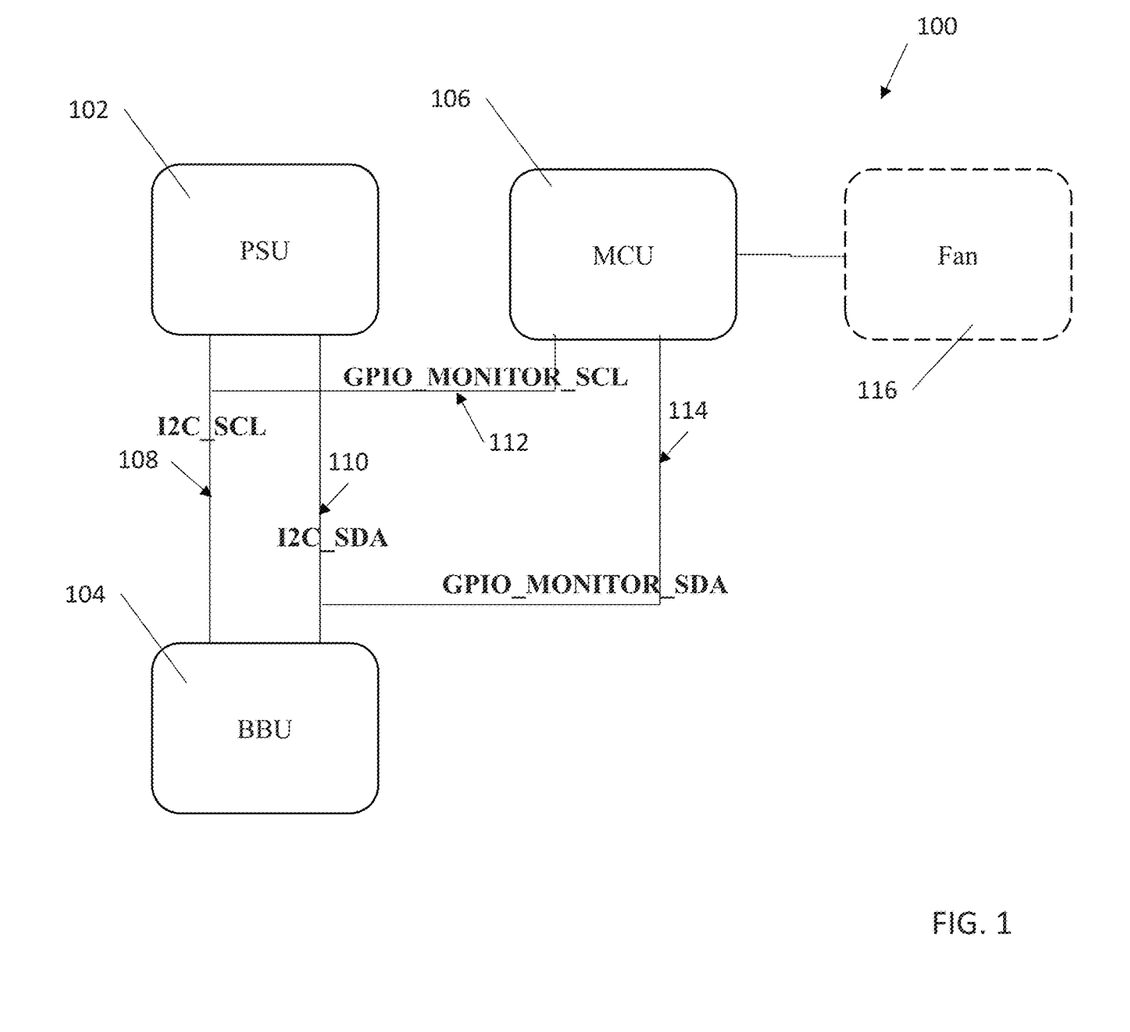
FIG. 1 is a block diagram of a system for monitoring serial communication between a power supply unit and a battery backup unit, according to one example embodiment of the present disclosure.

A system for monitoring serial communication according to one example embodiment of the present disclosure is illustrated in FIG. 1, and indicated generally by reference number 100. The system 100 includes a power supply unit (PSU) 102, a battery backup unit (BBU) 104, a serial line 108 (e.g., an I2C serial clock line (SCL)) coupled between the power supply unit 102 and the battery backup unit 104, a serial line 110 (e.g., an I2C serial data line (SDA)) coupled between the power supply unit 102 and the battery backup unit 104, and a controller 106.

A monitor line 112 is coupled between the controller 106 and the serial line 108, and a monitor line 114 is coupled between the controller 106 and the serial line 110. The controller 106 is configured to monitor a digital communication transmitted on the serial lines 108 and 110 between the power supply unit 102 and the battery backup unit 104, interpret a message included in the monitored digital communication, and perform a control function according to the interpreted message.

The system 100 allows the controller 106 to monitor a serial communication bus (e.g., the I2C serial clock and data lines 108 and 110) between devices that do not communicate directly with the controller. For example, the power supply unit 102 and the battery backup unit 104 are not in direct communication with the controller 106 because they do not send messages directly to the controller 106, are not programmed to send messages to the controller 106, are not aware that the controller 106 is monitoring the I2C serial clock and data lines 108 and 110, etc. Therefore, the controller 106 may be considered as using indirect communication feedback for supervisory control.

The controller 106 may interpret a digital communication message on the I2C serial clock and data lines 108 and 110, and use the extracted message as feedback for control of a device. For example, the controller 106 may use the extracted message to control a device 116 that is separate from the power supply unit 102 and the battery backup unit 104 (such as a fan, etc.), may use the extracted message to control the power supply unit 102 and/or the battery backup unit 104, etc.

Figure 2:
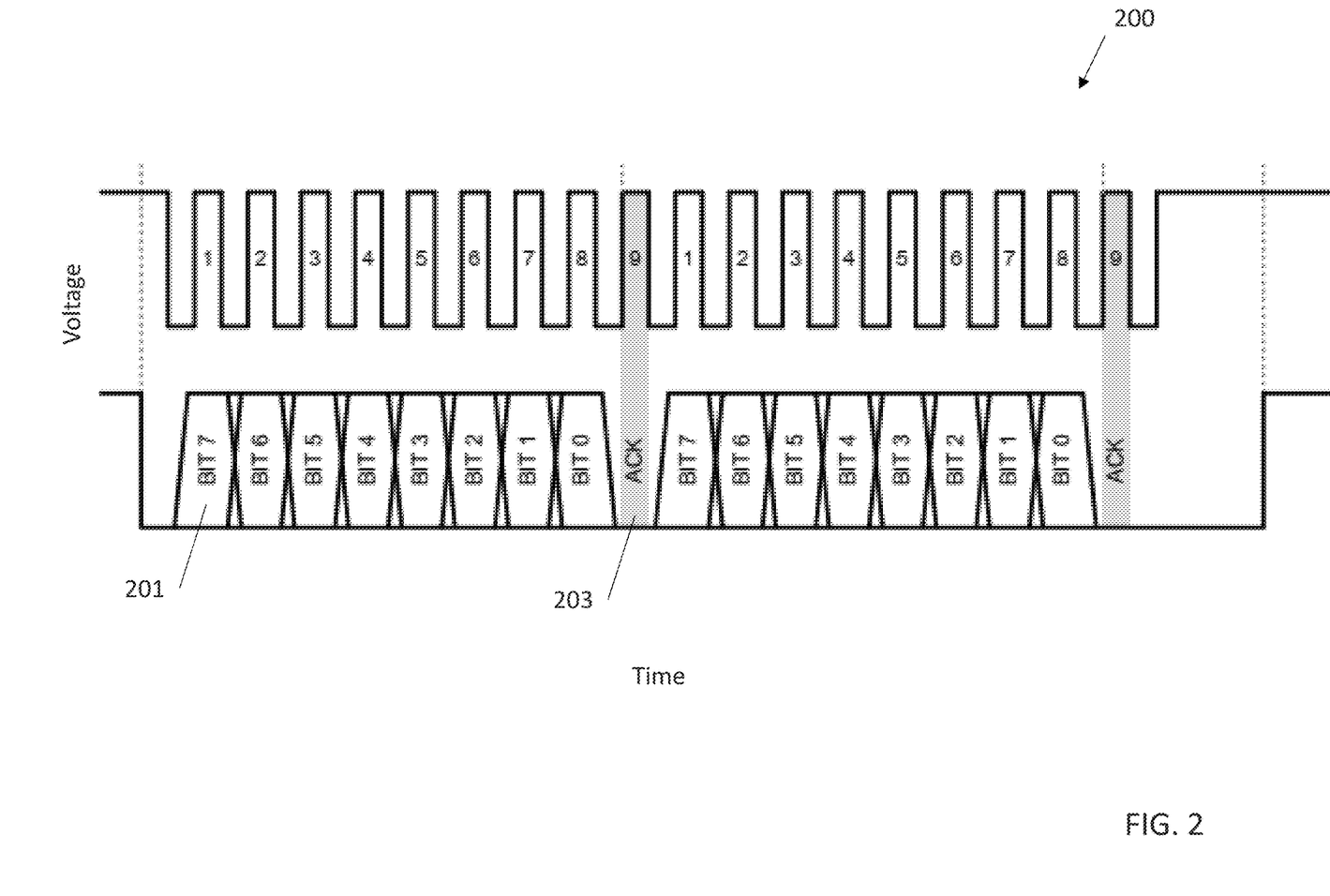
FIG. 2 is a waveform diagram of an example I2C communication message of the system of FIG. 1.

FIG. 2 illustrates an example waveform 200 of messages transmitted between the power supply unit 102 and the battery backup unit 104, along the I2C serial clock and data lines 108 and 110. The messages include multiple bits 201, which are separated by an acknowledgement 203.

For example, as shown in FIG. 2, a first message includes eight bits 201 (e.g., BIT 0 through BIT 7), followed by an acknowledgement 203. Then a second message includes eight more bits 201, followed by another acknowledgement 203.

The controller 106 may be configured to interpret the message by determining at least one of a start bit, an address, an acknowledgment, a negative acknowledgment, a data value, a stop bit of the digital communication, etc. For example, the controller 106 may identify the bits 201 or combinations of bits 201 that correspond to a start or stop of a message, that provide data values or addresses, etc. The controller 106 may identify the acknowledgments 203 to separate messages, etc.

Tables 1 and 2 below illustrate an example I2C message frame to be interpreted by the controller 106, where the power supply unit 102 is communicating with the backup battery unit 104 via a smart battery data protocol, and the battery temperature has a command code of (0x08).

TABLE 1

| S | BBU Addr/W | A | BBU Temperature Command Code (0 × 08) | A |
| --- | --- | --- | --- | --- |

TABLE 2

| Sr | BBU Addr/Rd | A | Data Byte 1 | A | Data Byte 2 | N | P |
| --- | --- | --- | --- | --- | --- | --- | --- |

The controller 106 may be configured to obtain a data value from the message, and to perform supervisory control of the device 116, the battery backup unit 104, the power supply unit 102, etc., according to the obtained data value. For example, when the device 116 is a fan, the controller 106 may be configured to control the speed of the fan by comparing the extracted temperature to a target temperature.

As mentioned above, the smart battery data protocol uses 0x08 as the command code for the controller 106 to look for in the I2C message frame to determine a temperature of the backup battery unit 104. Example command codes in the smart battery data protocol are listed below in Table 3, although other embodiments may use messages other than the smart battery data protocol, etc.

TABLE 3

| Slave Functions | Code |
| --- | --- |
| RemainingCapacityAlarm | 0 × 01 |
| RemainingTimeAlarm | 0 × 02 |
| BatteryMode | 0 × 03 |
| AtRate | 0 × 04 |
| AtRateTimeToFull | 0 × 05 |
| AtRateTimeToEmpty | 0 × 06 |
| AtRateOK | 0 × 07 |
| Temperature | 0 × 08 |
| Voltage | 0 × 09 |
| Current | 0 × 0a |
| AverageCurrent | 0 × 0b |
| MaxError | 0 × 0c |
| RelativeStateOfCharge | 0 × 0d |
| AbsoluteStateOfCharge | 0 × 0e |
| RemainingCapacity | 0 × 0f |
| FullChargeCapacity | 0 × 10 |
| RunTimeToEmpty | 0 × 11 |
| AverageTimeToEmpty | 0 × 12 |
| AverageTimeToFull | 0 × 13 |
| ChargingCurrent | 0 × 14 |
| ChargingVoltage | 0 × 15 |
| BatteryStatus | 0 × 16 |
| CycleCount | 0 × 17 |
| DesignCapacity | 0 × 18 |
| DesignVoltage | 0 × 19 |
| SpecificationInfo | 0 × 1a |

Figure 3:
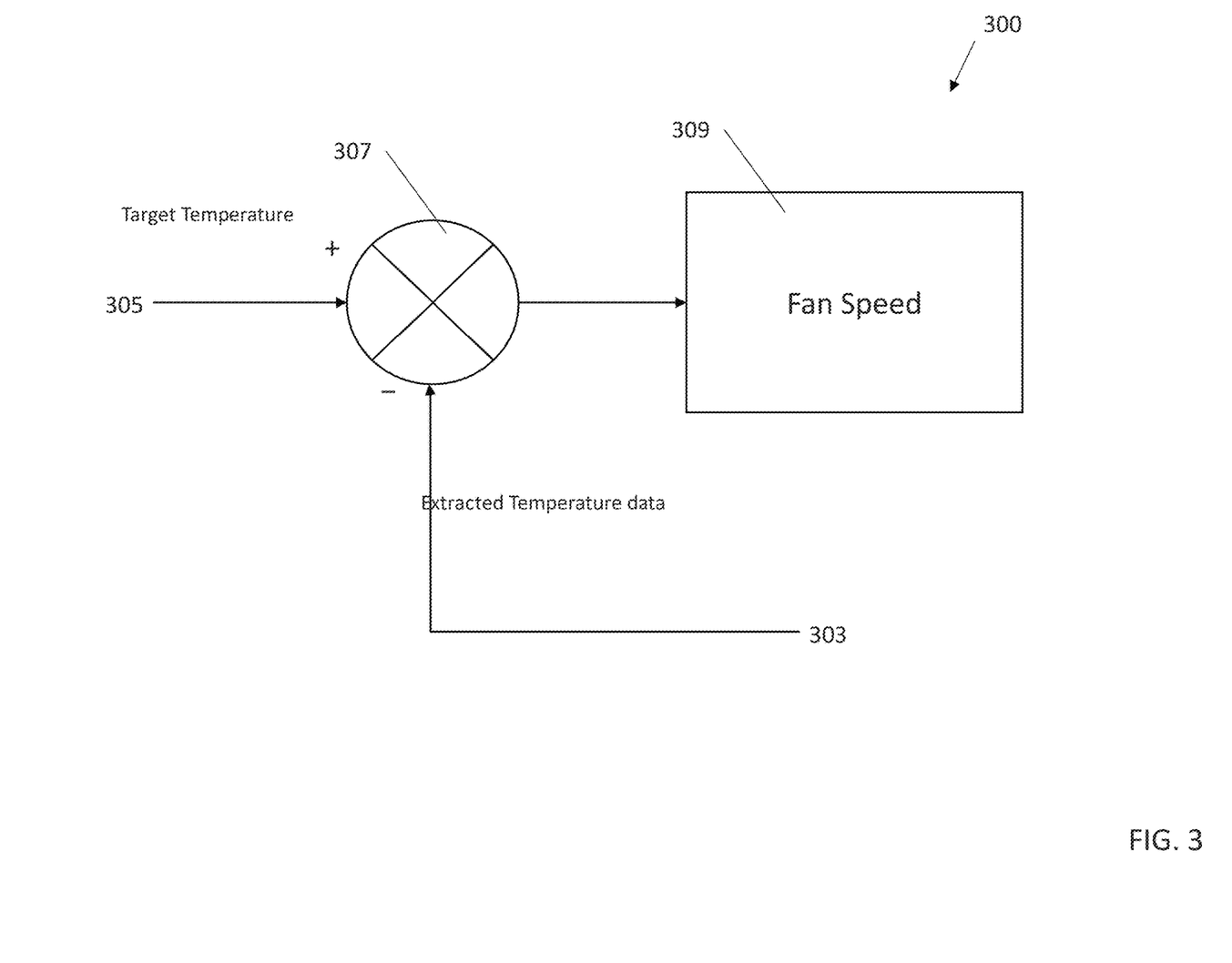
FIG. 3 is a block diagram of an example fan speed control method performed by the controller of the system of FIG. 1.

FIG. 3 illustrates an example diagram of a control circuit 300 for controlling the fan 116 based on a temperature extracted from a message on the I2C serial clock and data lines 108 and 110. As shown in FIG. 3, the controller 106 extracts temperature data 303 from the message on the I2C serial clock and data lines 108 and 110. For example, the controller 106 may determine if a packet of the message is for a specific command (e.g., BBU TEMPERATURE 0x08), and extract the corresponding data.

The controller 106 then compares the temperature data 303 to a target temperature reference 305 via a comparator 307, and outputs a control signal to a motor 309 for controlling speed of the fan 116. The target temperature reference 305 may include any suitable voltage reference, controller setting value, etc. The comparator 307 may include any suitable differential amplifier, controller calculation, etc., for determining a difference between the target temperature reference 305 and the temperature data 303 extracted from the message.

In some embodiments, the system 100 allows for monitoring of a shelf application where the shelf connections of the power supply unit 102 and the battery backup unit 104 are already fixed and finalized (e.g., by a third party manufacturer, etc.). The system 100 allows for connection of the controller 106 to monitor communication between the power supply unit 102 and the battery backup unit 104.

For example, the controller 106 may provide fan speed control based on a temperature of the battery backup unit 104, even if the temperature of the battery backup unit 104 is not transmitted to the shelf. The controller 106 can monitor the I2C communications in order to control the fan 116.

In general, the system 100 may allow the controller 106 to perform additional control functions, housekeeping functions, etc., without changing the hardware of the power supply unit 102, the battery backup unit 104, or the I2C serial clock and data lines 108 and 110. For example, the controller 106 may control an LED display to indicate the health of the backup battery unit 104, etc.

Referring again to FIG. 1, a monitor line 112 is coupled between the controller 106 and the I2C serial clock line 108. A monitor line 114 is coupled between the controller 106 and the I2C serial data line 110. Although FIG. 1 illustrates the monitor lines 112 and 114 as general-purpose input-output (GPIO) lines, other embodiments may include any suitable wires, traces, buses, etc., coupled between the controller 106 and the I2C serial clock and data lines 108 and 110. In some embodiments, series resistor(s) may be physically connected between the controller 106 and the lines 108 and 110 to avoid interfering with communications on the lines 108 and 110.

The I2C serial clock line 108 and the I2C serial data line 110 may each be connected directly between the power supply unit 102 and the battery backup unit 104. For example, the lines 108 and 110 may not be interrupted by the controller 106, or the monitor lines 112 and 114 (e.g., the controller 106 may not be connected between the battery backup unit 104 and the power supply unit 102, etc.).

Therefore, the controller 106 may monitor the digital communications on the lines 108 and 110 without introducing a delay to the digital communications (e.g., the controller 106 may not receive a digital communication from one of the devices 102 and 104 and rebroadcast the digital communication to the other device, etc.).

Although FIG. 1 illustrates the lines 108 and 110 as I2C serial clock and data lines, in other embodiments the lines 108 and 110 may be other suitable serial communication lines. For example, the battery backup unit 104 and the power supply unit 102 may be connected via a serial peripheral interface (SPI) bus, a controller area network (CAN) bus, a universal asynchronous receiver-transmitter (UART) bus, etc.

The battery backup unit 104 and the power supply unit 102 may be connected via only one line, via two lines, via three lines, via four or more lines, etc. The lines 108 and 110 may include any suitable wire, conductive trace on a circuit board, dedicated bus architecture, etc.

The controller 106 may include any suitable microprocessor, microcontroller, integrated circuit, digital signal processor, etc., which may include memory. The controller 106 may be configured to perform (e.g., operable to perform, etc.) any of the example processes described herein using any suitable hardware and/or software implementation. For example, the controller 106 may execute computer-executable instructions stored in a memory, may include one or more logic gates, control circuitry, etc., as described above.

FIG. 1 illustrates a system 100 including a power supply unit 102 and a battery backup unit 104. In other embodiments, a controller may monitor I2C communications between other types of electronic devices. For example, FIG. 4 illustrates a system 400 include a master electronic device 402 and a slave electronic device 404.

The master electronic device 402 is connected to the slave electronic device 404 via an I2C communication bus including an I2C serial clock line 408 and an I2C serial data line 410. A controller 406 monitors communications on the lines 408 and 410 between the master electronic device 402 and the slave electronic device 404.

For example, a monitor line 412 is coupled between the controller 406 and the I2C serial clock line 408, and a monitor line 414 is coupled between the controller 406 and the I2C serial data line 410. The controller 406 is configured to monitor a digital communication transmitted on the I2C serial clock and data lines 408 and 410, interpret a message included in the monitored digital communication, and perform a control function according to the interpreted message.

Figure 4:
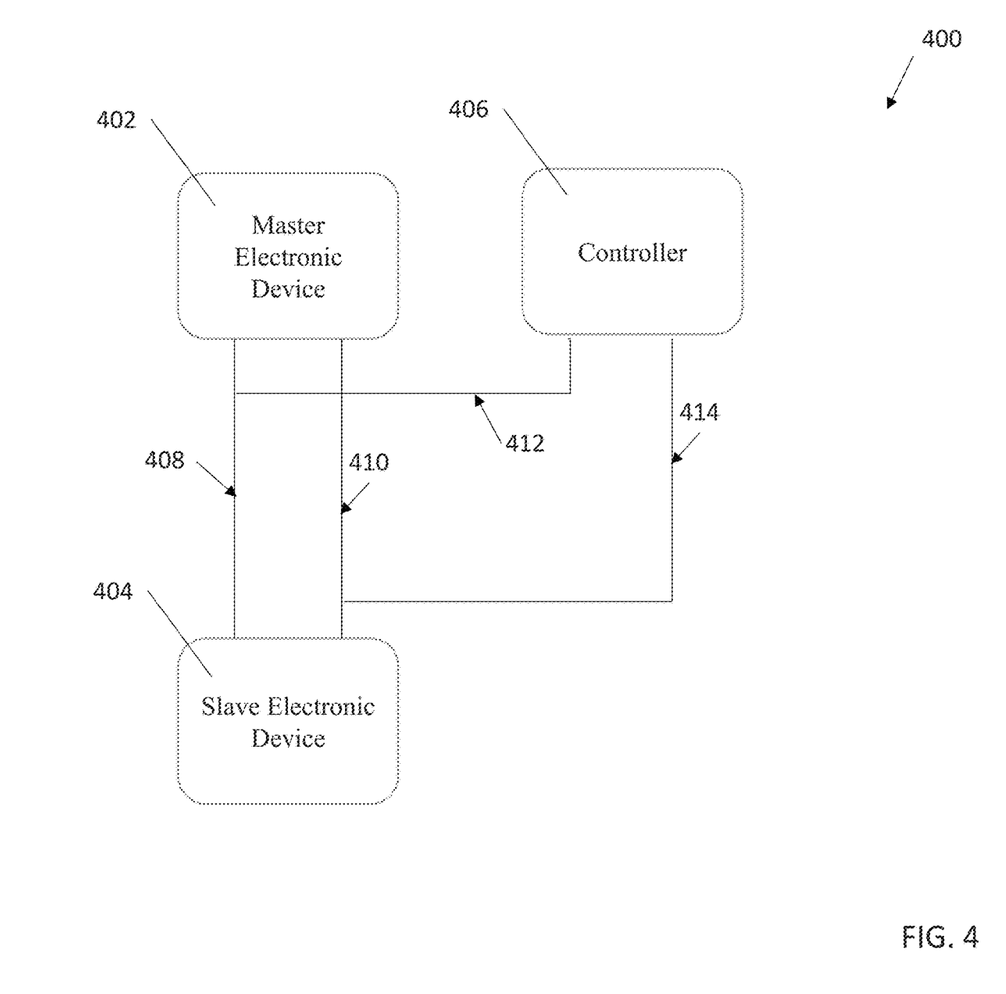
FIG. 4 is a block diagram of a system for monitoring serial communication between a master electronic device and a slave electronic device, according to another example embodiment of the present disclosure.

Although FIG. 4 illustrates the lines 408 and 410 as I2C serial clock and data lines, in other embodiments the lines 408 and 410 may be other suitable serial communication lines. For example, the master electronic device 402 and the slave electronic device 404 may be connected via a serial peripheral interface (SPI) bus, a controller area network (CAN) bus, a universal asynchronous receiver-transmitter (UART) bus, etc.

The master electronic device 402 and the slave electronic device 404 may be connected via only one line, via two lines, via three lines, via four or more lines, etc. The lines 408 and 410 may include any suitable wire, conductive trace on a circuit board, dedicated bus architecture, etc.

In another example embodiment, a method for monitoring serial communication in a system is disclosed. The system includes a power supply, a battery backup unit, a serial bus coupled between the power supply and the battery backup unit, a controller, and a monitor line coupled between the controller and the serial bus. The method includes monitoring, by the controller, a serial communication transmitted on the serial bus between the power supply and the battery backup unit, interpreting a message included in the monitored serial communication on the serial bus, and performing a control function according to the interpreted message of the digital communication.

The method includes monitoring, by the controller, a serial communication transmitted on the serial bus between the power supply and the battery backup unit, interpreting a message included in the monitored serial communication on the serial bus, and performing a control function according to the interpreted message of the digital communication.

Performing the control function may include controlling operation of at least one of the power supply and the battery backup unit, and/or controlling operation of a device other than the power supply and the battery backup unit. The system may include a fan, and performing the control function may include controlling a speed of the fan according to the interpreted message. For example, interpreting the message may include extracting a temperature of the battery backup unit from the message, and controlling the speed of the fan may include comparing the extracted temperature to a target temperature reference.

In some embodiments, the serial bus includes at least one of an inter-integrated circuit (I2C) bus, a serial peripheral interface (SPI) bus, a controller area network (CAN) bus, and a universal asynchronous receiver-transmitter (UART) bus.

In another example embodiment, a system for monitoring serial communication includes a master electronic device, and a slave electronic device connected with the master electronic device via a serial bus connection. The serial bus connection includes a first serial line coupled between the master electronic device and the slave electronic device and a second serial line coupled between the master electronic device and the slave electronic device.

The system also includes a controller, a first monitor line coupled between the controller and the first serial line, and a second monitor line coupled between the controller and the second serial line. The controller is configured to monitor a serial communication transmitted on the serial bus connection between the master electronic device and the slave electronic device, interpret a message included in the monitored serial communication, and perform a control function according to the interpreted message.

The controller may be configured to interpret the message by determining at least one of a start bit, an address, an acknowledgment, a negative acknowledgment, a data value, and a stop bit of the serial communication. The controller may be configured to obtain the data value from the interpreted message and to perform the control function according to the obtained data value.

In some embodiments, the controller is configured to perform the control function by controlling operation of at least one of the master electronic device and the slave electronic device. The controller may be configured to perform the control function by controlling operation of a device other than the master electronic device and the slave electronic device.

In some embodiments, the first serial line is connected directly between the master electronic device and the slave electronic device, the second serial line is connected directly between the master electronic device and the slave electronic device, and the controller is not in communication with the master electronic device and the slave electronic device. The controller, the first monitor line and the second monitor line may not interrupt the first serial line or the second serial line between the master electronic device and the slave electronic device. For example, monitoring the serial communication may not introduce a delay to the serial communication.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system for monitoring a master-slave communication, the system comprising:
   a master device;
   a slave device;
   a serial communication line directly coupled between the master device and the slave device;
   a controller;
   a first monitor line coupled between the controller and the serial communication line;
   wherein the controller is configured to:
      monitor a digital communication transmitted on the serial communication line from one of the master device and the slave device directed to the other of the master device and the slave device, wherein the digital communication comprises a message;
      interpret the message; and
      perform a control function based on the interpreted message;
   wherein the master device and the slave device are not aware that the controller is configured to monitor the digital communication.

2. The system of claim 1, wherein the controller is configured to interpret the message by determining at least one of a start bit, an address, an acknowledgment, a negative acknowledgment, a data value, and a stop bit of the digital communication.

3. The system of claim 2, wherein the controller is configured to interpret the message to obtain the data value of the digital communication and to perform the control function based on the obtained data value.

4. The system of claim 1, wherein the master device comprises a power supply; and
wherein the slave device comprises a battery backup unit.

5. The system of claim 1, wherein the controller is configured to perform the control function by controlling operation of a device other than the master device or the slave device.

6. The system of claim 5, wherein the other device comprises a fan; and
wherein the controller is configured to control a speed of the fan based on the interpreted message.

7. The system of claim 6, wherein the controller is configured to:
interpret the message by extracting a temperature of the slave device from the message transmitted from the slave device to the master device; and
control the speed of the fan by comparing the extracted temperature to a target temperature reference.

8. The system of claim 1, wherein the controller and the first monitor line do not interrupt the serial communication line between the master device and the slave device.

9. The system of claim 8, wherein the controller is configured to monitor the digital communication without introducing a delay to the digital communication.

10. The system of claim 1, wherein the serial communication line comprises a line of one of an inter-integrated circuit (I2C) bus, a serial peripheral interface (SPI) bus, a controller area network (CAN) bus, and a universal asynchronous receiver-transmitter (UART) bus.

11. A method for monitoring serial communication in a system, the system including a master device, a slave device, a serial bus directly coupled between the master device and the slave device, a controller, and a monitor line coupled between the controller and the serial bus, the method comprising:
monitoring, by the controller, a serial communication transmitted on the serial bus from one of the master device and the slave device directed to the other of the master device and the slave device, wherein the digital communication comprises a message;
interpreting the message; and
performing a control function based on the interpreted message;
wherein the master electronic device and the slave electronic device are not aware that the controller is configured to monitor the serial communication.

12. The method of claim 11, wherein interpreting the message includes determining at least one of a start bit, an address, an acknowledgment, a negative acknowledgment, a data value, and a stop bit of the serial communication.

13. The method of claim 12, further comprising obtaining the data value from the interpreted message to perform the control function according to the obtained data value.

14. The method of claim 11, wherein the master device comprises a power supply; and
wherein the slave device comprises a battery backup unit.

15. The method of claim 11, wherein performing the control function includes performing the control function by controlling operation of a device other than the master device or the slave device.

16. The method of claim 11, wherein the system includes a fan; and
wherein performing the control function comprises controlling a speed of the fan based on the interpreted message.

17. The method of claim 16, wherein interpreting the message comprises extracting a temperature of the slave device from the message; and
wherein controlling the speed of the fan includes comparing the extracted temperature to a target temperature reference.

18. The method of claim 11, wherein the controller and the monitor line do not interrupt the serial bus between the master device and the slave device.

19. The method of claim 18, wherein monitoring the serial communication does not introduce a delay to the serial communication.

* * * * *